United States Patent [19]
Pugh

[11] 3,713,550
[45] Jan. 30, 1973

[54] CHARGE/DISCHARGE ARRANGEMENTS FOR NUCLEAR REACTOR

[76] Inventor: John Pugh, 11 Charles II Street, Winfrith, England

[22] Filed: March 24, 1970

[21] Appl. No.: 22,159

[30] Foreign Application Priority Data

April 3, 1969 Great Britain.....................17,734/69

[52] U.S. Cl......................214/27, 176/30, 214/18 N
[51] Int. Cl. ...............................................G21c 19/10
[58] Field of Search............214/18 N, 27, 28; 176/30

[56] References Cited

UNITED STATES PATENTS 3,383,286   5/1968   Paget..............................214/18 N X
3,253,995   5/1966   Antonsen et al.................214/18 N X
3,044,947   7/1962   Payne...................................176/30 X

*Primary Examiner*—Robert G. Sheridan
*Attorney*—Larson, Taylor and Hinds

[57] ABSTRACT

An arrangement for replacing nuclear reactor core components which are disposed about the axis of an access penetration in the reactor vessel wall, the arrangement comprising a guide tube means, said means being introducable into the penetration where, in an operative condition the tube means communicates the vessel interior with a charging compartment exteriorly thereof and an eccentric carrying a core component engaging member, means rotatably mounting the eccentric in the tube and means for adjusting the rotational axis of the eccentric with respect to the tube axis and further means for adjusting the axis of the tube relative to that of the penetration.

7 Claims, 12 Drawing Figures

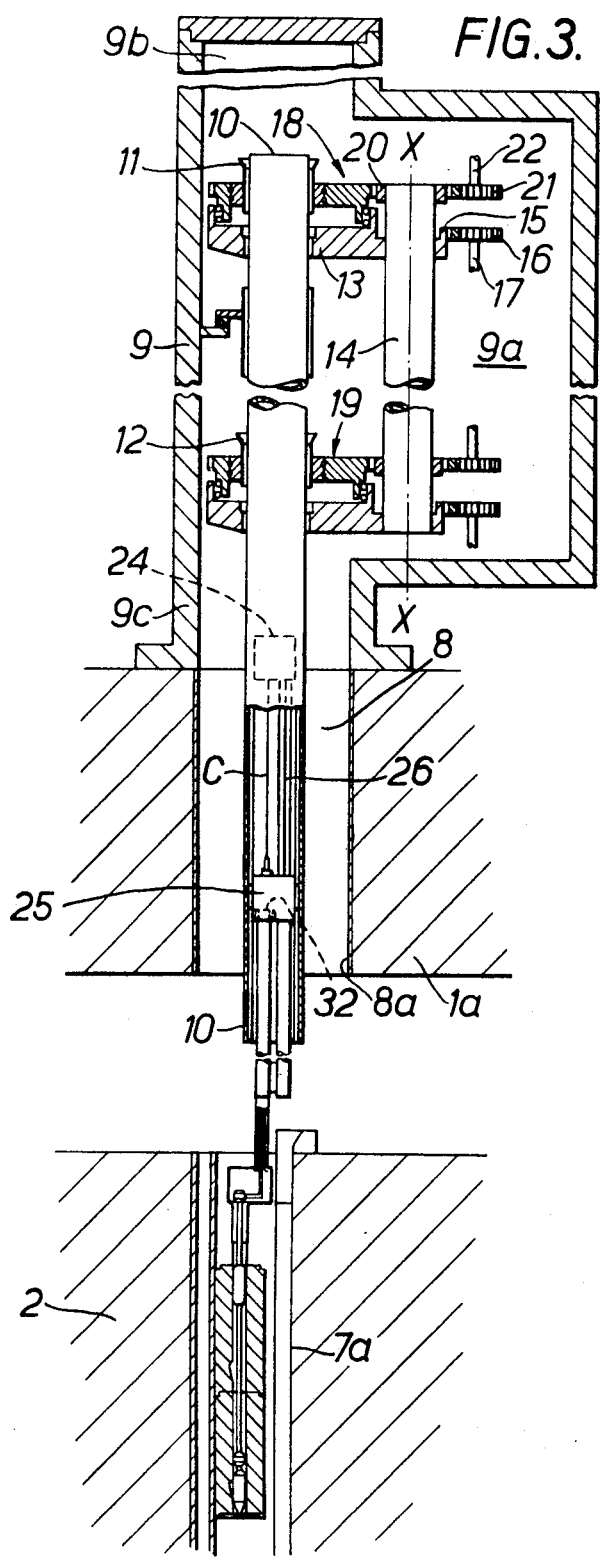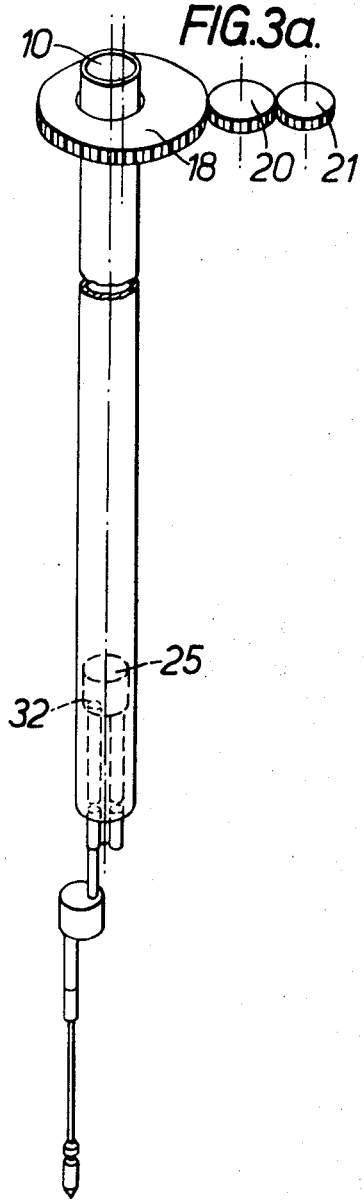
FIG. 3.
FIG. 3a.

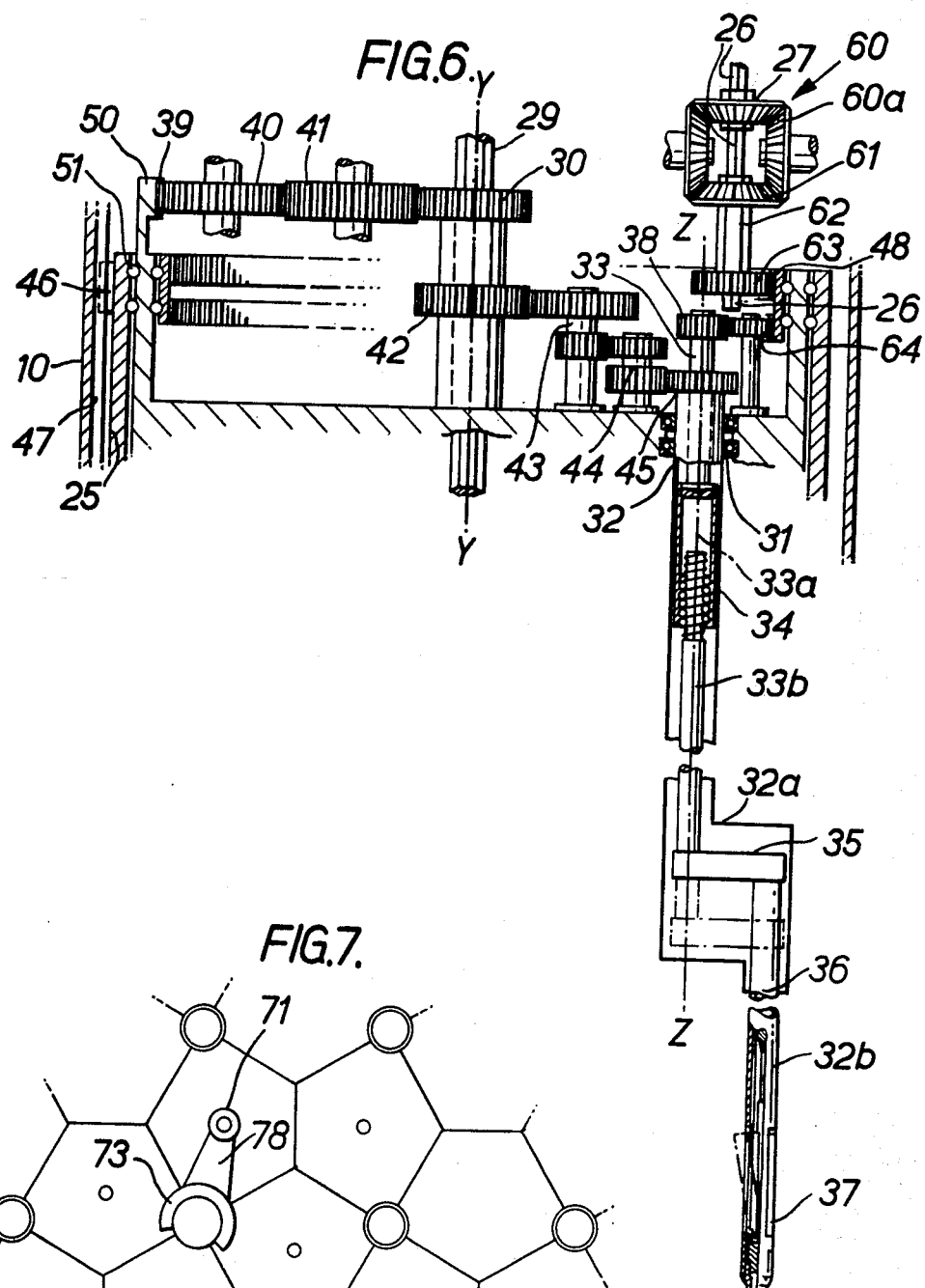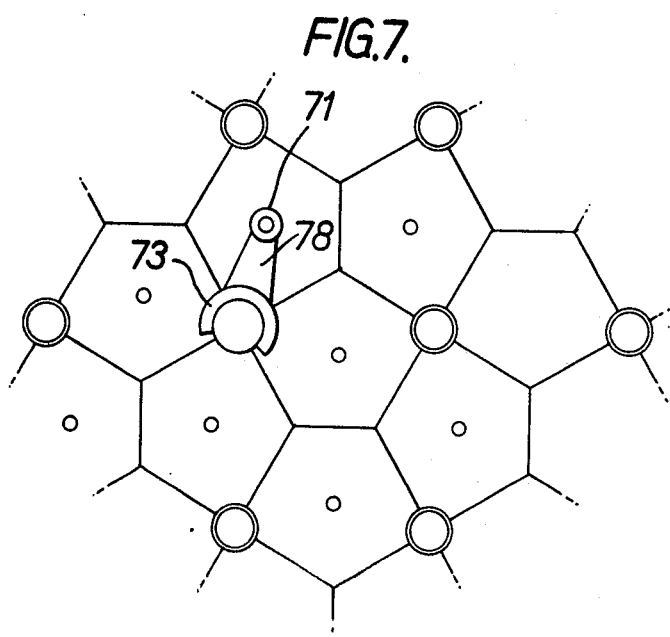

CHARGE/DISCHARGE ARRANGEMENTS FOR NUCLEAR REACTOR

BACKGROUND OF THE INVENTION

This invention relates to nuclear reactors and chiefly to the provision of means for replacing core components, for example moderator blocks which may be fuel bearing, in the reactor core. It has been proposed that a reactor core may be designed to have its fuel bearing components arranged as clusters or groups disposed beneath respective closable access penetrations in the reactor vessel wall and to make provision for lifting these components through the penetration by means of a lifting tool which is designed to enter the vessel and extend its component engaging portion laterally in which position it may be rotated about the axis, of the penetration, so that it is correctly positioned to sieze hold of and remove one of the components of that cluster or group.

SUMMARY OF THE INVENTION

According to the invention, there is provided an arrangement for replacing nuclear reactor core components, which are disposed about the axis of an access penetration in the reactor vessel wall, the arrangement comprising a guide tube means, said means being introducable into the penetration where, in an operative condition, the tube means communicates the vessel interior with a charging compartment exteriorly thereof, an eccentric carrying a core component engaging member, means rotatably mounting the eccentric in the tube and means for adjusting the rotational axis of the eccentric with respect to the tube axis and further means for adjusting the axis of the tube relative to that of the penetration. Preferably, the axis of rotation of the eccentric is offset from the axis of the guide tube means and is adjustable in position by rotation of the guide tube in the penetration. The axis of the guide tube means may itself be rotatable or translatable in order to bring it more nearly into coincidence with axis of the underlying cluster.

Preferably the invention resides in an arrangement for replacing nuclear reactor core components which are disposed about the axis of an access penetration in the wall of the reactor vessel, the arrangement comprising a tubular member or guide tube which is introduced into the vessel and having mounted eccentrically within it a dependant member. The latter is preferably rotatable on its own axis and also about the axis of the tubular member and has a cranked portion, the lower part of which carries a core component gripping device. The dependent member may be a rod within a tube, the two parts being movable endwise to effect operation of the gripping device so that this device may be operated at any rotational position.

With the core blocks disposed in groups about an access penetration in the reactor vessel, the dependent member is introducable into the vessel and rotatable to engage a suitable feature of one of the blocks, once engaged by the gripping device, the block is movable away from the other blocks in its group before being moved to a position under the access penetration. The motion of the block held by the gripping device is preferably achieved by the simultaneous rotation of the dependent member and the tubular member in a fixed ratio to one another.

DESCRIPTION OF THE DRAWINGS

In order that the invention may be better understood one embodiment thereof will now be described with reference to the accompanying drawings in which:

FIG. 3 is an axial cross section through a stand pipe penetrating the pressure vessel top cap and showing a section through part of the core on the lines III—III of FIG. 2 with the refuelling machine engaging core components;

FIG. 3A shows parts of FIG. 3 in plan on their respective axes;

FIG. 6 is an axial cross section view of the gearing arrangements for the refuelling machine;

FIG. 7 is a scrap view in plan of the core with a restrainer member in position;

DESCRIPTION OF THE PREFERRED EMBOBIMENT

Figure 1:
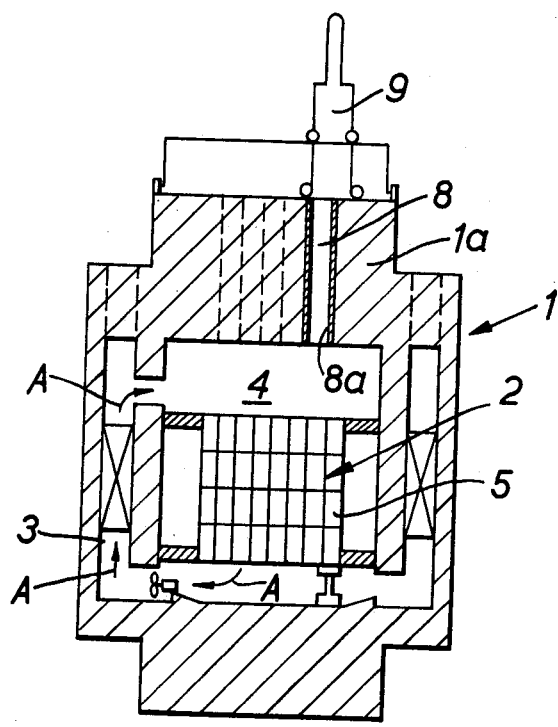
FIG. 1 is a diagrammatic cross section of a gas cooled nuclear reactor to which the invention is applied.

In FIG. 1 the nuclear reactor in which the core component replacement arrangement is used comprises a pressure vessel 1 of prestressed concrete construction housing a nuclear reactor core 2 in which the core components are fuel bearing blocks of moderator material built up into columns the block having coincident holes through which coolant gas is passed to remove heat from the fuel. The coolant circuit is indicated by arrows A and will be seen to pass downwards through the core into cavities 3 containing heat exchangers where coolant heat in the core gives up its heat to a secondary fluid and is returned to an inlet plenum chamber 4 separating the underside of the pressure vessel top cap 1a from the upper face of the core.

Figure 2:
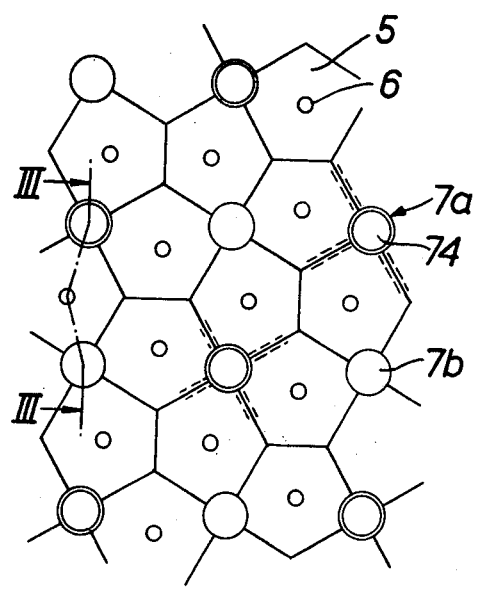
FIG. 2 is a diagrammatic scrap plan view of the top of the reactor core.

The core comprises columns of blocks 5 each of substantially irregular pentagonal shape in cross section as shown in FIG. 2. Each block has a central hole 6 for handling purposes and holes for coolant (not shown) in which are supported annular bodies of nuclear fuel. On a square lattice at the corners of the adjacent blocks, lengitudinal holes 7a, 7b are formed parallel to the column axis. Alternate ones of these holes 7a are employed to receive spreader rods or plugs and at 7b for control rods and facilities exist for the withdrawal and insertion of these members independently of one another into their appropriate holes is effected by operations effected through respective penetrations 8 in the top cap 1a of the pressure vessel 1 which are lined with stand pipes 8a. In the cold condition, sufficient clearance must be left between the faces of adjacent blocks, to permit thermal expansion of the blocks to take place without building up excessive stresses. In operation, irradiation induced effects may cause distortion of the blocks, thus resulting in their becoming jammed and difficult to remove for refuelling purposes. It is therefore desirable to provide additional clearance between faces of adjacent blocks, so as to facilitate withdrawal and replacement of blocks during refuelling. However, if additional looseness is present in the core throughout normal operation, it may permit increased distortion of the blocks, vibration or other undesirable effects. It is therefore a feature that additional clearance to facilitate fuel handling is provided between faces of adjacent blocks, but that relative movements due to this additional clearance are prevented by the presence of the spreader rod. It is intended that the penetrations 8 should be vertically above the holes 7 in the core and whilst the holes 7b are maintained in their relative positions by the control rod thimbles, the holes 7a are more than likely to become misaligned with the penetrations 8 as they are not similarly located, bearing in mind that the holes accommodate spreader plugs which fix the working clearance between columns and are not connected with the top cap of the concrete pressure vessel. The top cap may be 15 feet thick and difficulties in the alignment of lifting tools inserted into the vessel through penetrations 8 to engage in holes 7a may be experienced, but for this invention.

FIG. 3 shows by a cross section through a central hole 6 in one of the blocks 5 and through a spreader plug hole 7a, (which it will be observed are formed by grooves in adjacent columns), the relative disposition of a pipe 8a in the top cap 1a and the underlying core. This figure also shows a part of the vehicular refuelling machine 9 located over and in communication with the particular penetration 8. The machine 9 provides shielding for an inner compartment 9a. The latter is symetrical about vertical axis X — X and aligned upper and lower cylindrical extensions 9b, 9c, of the compartment 9a have their axes off-set from the axis X — X. For a charging operation the machine 9 is moved into a position shown with the lower extension 9c coincident with the correct underlying penetration 8. The relative positions of the penetration 8 and the underlying spreader plug hole 7a is not adjustable and it is possible for these two items to become misaligned due to movement of the core during operation of the reactor. In order to compensate for this misalignment, fuel handling assembly is mounted within a guide tube 10 whose axis is adjustable with respect to that of the penetration 8. To this end, the guide tube 10 is mounted to extend through spaced upper and lower guide funnels 11, 12. The funnels are mounted at the upper and lower parts of the chamber 9a and are adjustable to vary the position of the guide tube axis with respect to the axis of the standpipe 8a.

The upper guide funnel 11 is mounted on the end of an arm 13 fixed to a funnel center column 14 which is a tubular structure rotatably mounted on the axis X — X of the refuelling machine chamber 9a. The lower guide funnel 12 is similarly mounted, and driven, on the lower end of the funnel center column 14. The funnels 11, 12 may be swung about the axis X — X into the position illustrated or to any other position by rotating the column 14 on its axis. For this purpose the column 14 has a segmented rack 15 fixed to its upper periphery and in mesh with a pinion 16 on a shaft 17. By rotation of the shaft 17, the arms 13 can be swung to move the funnels clear of the space in the charge/machine compartment 9a between the two aligned extensions 9b, 9c. This allows other items such as the shield plug for the penetration 8 to be raised or to be lowered into position. However, for refuelling operations the guide funnels 11, 12 can be moved into the position shown by rotation of the gear 16 which serves as a coarse adjustment and once this adjustment has been made a fine adjustment is provided to cover a positional tolerance of several millimeters. This fine adjustment is effected by mounting each guide funnel eccentrically within ring gears 18, 19, and this is rotated on its eccentric axis by gears 20, 21, mounted on bearings carried by the funnel center column 14. The gear 20 coaxial with column 14 meshes with pinion 21 carried on shaft 22, the rotational position of which is determined through a differential gear train by remote control in order to correctly position the funnels. The column guide tube 10 is lowered down though the upper and lower funnels by a winch, not shown, in the upper part of the compartment 9b. Once within the guide funnels, the guide tube can be positioned by moving the funnels by rotation of the shafts 17, 22 so that the axis of the guide tube is aligned with the center of a cluster of blocks, specifically the axis of the spreader plug, by rotation of shaft 22.

Within the charge column guide tube 10 is slidably mounted a drive cylinder 24 which houses the main drive motors for the orientation of the axis of rotation and the rotation of the block engaging member. Beneath the drive cylinder 24 is mounted a charge column 25 which houses the transmission gear for transmitting the drives to the core component lifting gear. The column 25 is suspended from the cylinder 24 by a pair of cables C (one only of which is shown) wound on a winch within the cylinder 24 and the winch is driven to adjust the position of the column 25 vertically within the guide tube. A hexagonal shaft 26 driven by a motor (under remote control) in the cylinder 24 extends to enter the column 25 where it drivingly engages a pinion 27 and thence extends slidably through the pinion and through the column where it extends for sufficient length to ensure engagement with the pinion whatever the relative vertical positions of the cylinder and column (FIG. 6). A second motor within the cylinder 24 drives a second dependent shaft 29 also of hexagonal cross section which extends axially between cylinder 24 and column 25. The shaft 29 passes through a hexagonal bore in a pinion 30 (FIG. 6) and protrudes through the column 25.

Mounted in bearings 31 in the lower part of the column is a dependant tube 32 having a cranked portion 32a, and a lower portion 32b. Coaxially within the tube 32 is a shaft 33, the rotatable upper part 33a of which is coupled to drive through a screw and nut mechanism 34 an axially movable lower part 33b. The lower end of part 33b is connected to one end of a crank 35 whose other end is connected to a dependant rod 36. As shown the cranked part of the casing is so shaped as to allow the crank to be moved axially over a limited vertical distance. To the lower end of the tube 32b are pivotably mounted gripper latches 37 having slots which are engaged by pins carried by a lower part of the rod 36.

The shape of the slots are such that in response to relative vertical movement between rod and tube the latches 37 will extend or retract through apertures in the outer tube.

This vertical movement is controlled through the screw and nut mechanism 34, the screw portion being driven by a pinion 38 mounted on the shaft 33a within the column 25, whilst rotation of the crank on the axis of the shaft 33b (indicated at Z — Z) is achieved by rotating the tube 32.

The axis Z — Z of the shaft 33b (and its outer tube) is however also rotatable about the axis of the column 25 designated Y — Y, as described below.

The transmission gearing in the column 25 must be capable of yielding the following functions:
a. rotate output 33a independently of 32
b. rotate output 32 independently of 33a
c. rotate axis ZZ about axis YY
d. rotate axis ZZ about axis YY whilst the crank rotates on axis ZZ in a given ratio (for reasons which will become apparent below).

As shown in FIG. 6 the column 25 contains a drum 50, which is carried in bearings 51 fixed to the inside of the column 25, and to allow the drum to be rotated relative to the column 25, the latter has external keys 46 slidable in longitudinal key-ways 47 formed in the bore of the guide tube 10. A rack segment gear 39 is secured to the inner lip of the drum and this is engaged with gears 40 so as to be driven from pinion 30 via gear 41.

On the same shaft as the pinion 30 is a gear 42 which drives through compound gears 43, 44, on parallel lay shafts, a gear 45 formed on mouth of the tube 32. The gear ratios are such that gear 39 rotates the drum through 128½° while the tube 32 is rotated 180°. The significance of this will become clear from the description of the operation of the device during refuelling.

As explained above, the reaction on the drum bearings is transmitted to the guide tube 10 through keys 46 and key-ways 47 formed on the inside of the guide tube 10. To allow the gripper latches 37 to be operated at whatever position is assumed by the axis Z — Z relative to the axis Y — Y, the screw and nut mechanism 34 is driven by a shaft 26 through a differential gear 60 and compound ring gears 48 mounted in bearings on the inner face of the drum 50. The gear 27 engages planet pinions 60a which engages a bevel pinion 61 on a shaft 62. Fast on shaft 62 is a pinion 63 which engages one of the compound ring gears 48. The other ring gear meshes with pinion 64 which in turn drives pinion 38. The action is self-explanatory. The gear 38 may be driven in either sense by rotating pinion 27 appropriately and if at any time it is necessary to rotate the drum 50 to change the relative positions of the axis Y — Y and Z — Z whilst the latches 37 are held in a given position, then by holding the pinion 27 fixed, the planet pinions 60a will idle and transmit no output to the pinion 38.

Figure 8:
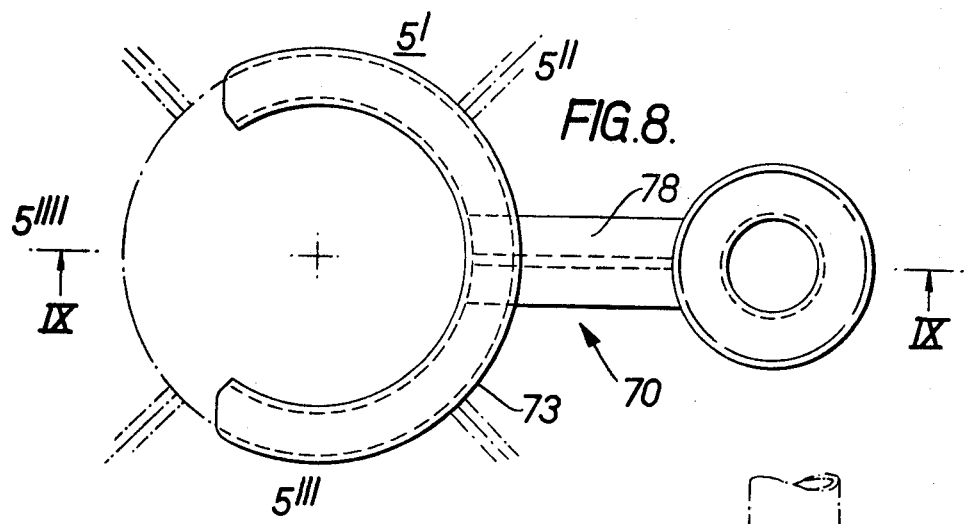
FIG. 8 is a plan view of a restrainer.
Figure 9:
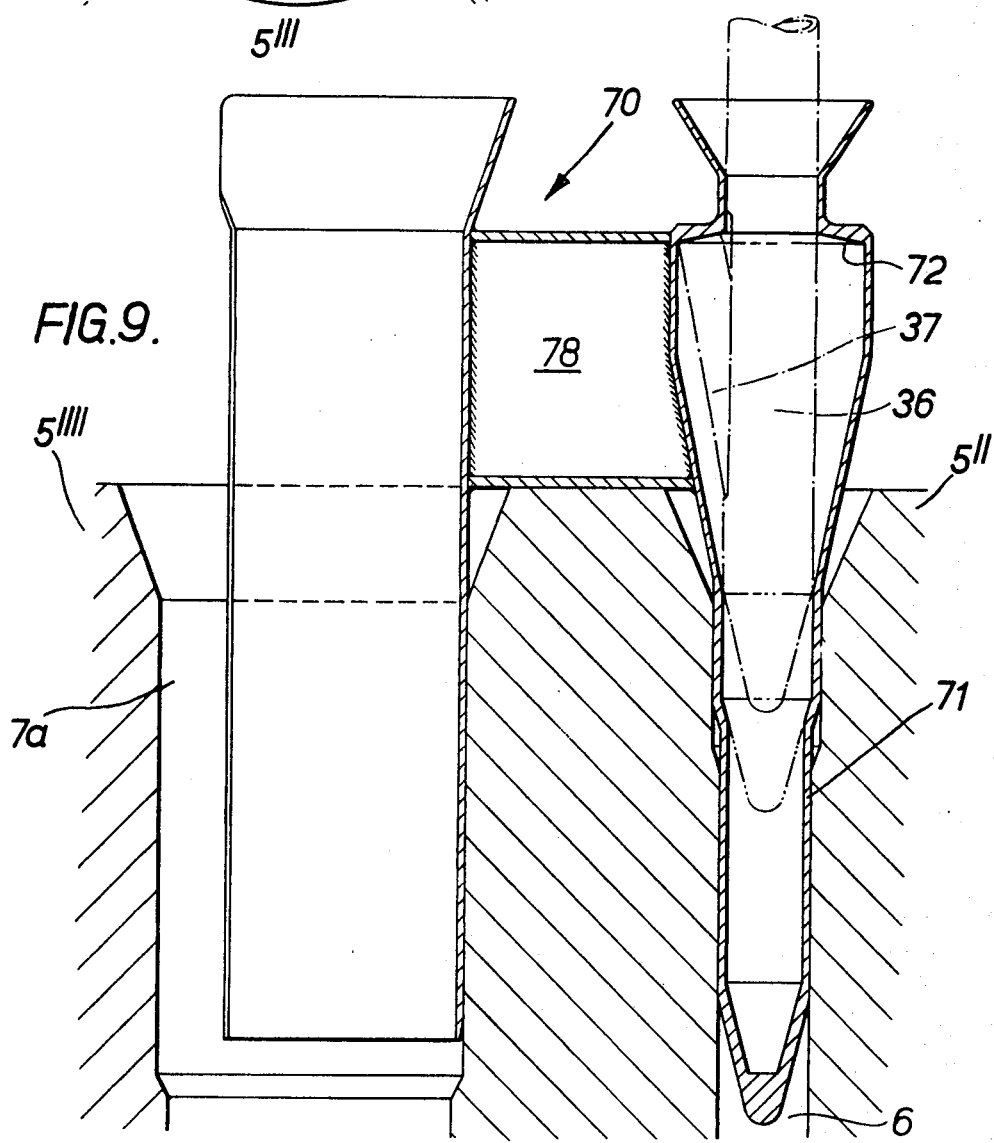
FIG. 9 is a cross section on the line IX—IX of a restrainer as shown in FIG. 8 in its operative position.
Figure 10:
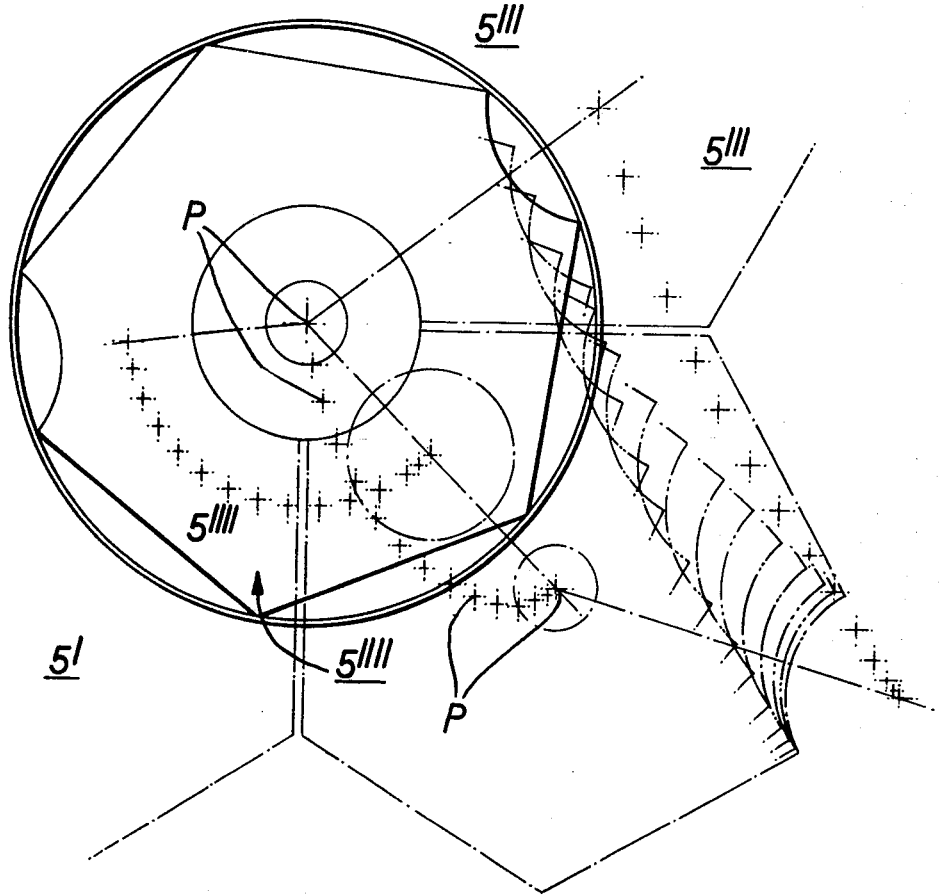
FIG. 10 is a diagram illustrating the path of movement of a core component as it is transported across the core into alignment with the penetration.

In applying the mechanism described above for refuelling a nuclear reactor core, the refuelling machine is moved into position over a penetration in top cap 1a of the pressure vessel. The closure devices, e.g. shield plugs, are then removed in a conventional manner by a winch and grapple in the upper extension 9b and placed within the charge machine chamber. The funnel center column 14 is then rotated to bring the guide funnels 11, 12 into coarse alignment with the standpipe axis. The charge column guide tube 10 is then lowered through the guide funnels 11, 12 which are then further adjusted in position to line up the guide tube axis with that of the spreader plug hole 7a to which the penetration gives access. The spreader plug 74 a cylindrical graphite tube is typical and is composed of short lengths, each lying within the extent of one core block 5. The top length of the spreader plug is then removed by lowering the charge cylinder 24 and column 25 through the guide tube 10 and then rotating the drum 50 and crank 35 so as to bring the tube 32b into a correct position so that on lowering the charge column further the tube 32b and its coaxial rod 36 enters the bore of the spreader plug. The latches 37 are then operated to engage grooves in the spreader plug bore and the plug removed from the core by a vertical lift. The machine is then operated to position a column restrainer 70 shown in FIGS. 8 and 9 in the hole vacated by the plug. The column restrainer 70 comprises a short hollow spike 71 with an internal shoulder 72 of a form so that it can be engaged by the latches 37 of the grapple. The spike carries a radial arm 78 to the end of which is welded an arcuate piece 73 which is really a short length of tube with a portion of the wall remote from the radius arm removed. The length of the radial arm 78 is such that when the spike 71 is inserted into the central hole 6 in an adjacent core component, the arcuate piece 73 slides into the hole 7a vacated by the spreader plug. The arcuate piece 73 of the restrainer thus serves to hold back the three adjacent fuel columns, say 5',5'' and 5' '' which border the spreader plug hole 7a and allow a block from the fourth fuel column 5'''' to be lifted up without fear of the other adjacent blocks toppling. The lower part 32b of the tube and its inner rod 36 is inserted into the central hole 6 in the unrestrained fuel block 5'''' which is lifted vertically clear of the core into the inlet plenum chamber 4 by raising the charge column 25 in the guide tube. The core block must now be moved horizontally across the top of the core into a position beneath the guide tube 10 without fouling control rod thimbles, etc. To move the fuel block 5'''' held by the latches 37 across the top of the core, the crank 35 is rotated about axis Z — Z simultaneously with rotation of the drum 50 about axis Y — Y so that the center of the fuel block traverses the path P — P illustrated in FIG. 10 until it takes up a position beneath the access penetration as shown in FIG. 4.

Figure 4:
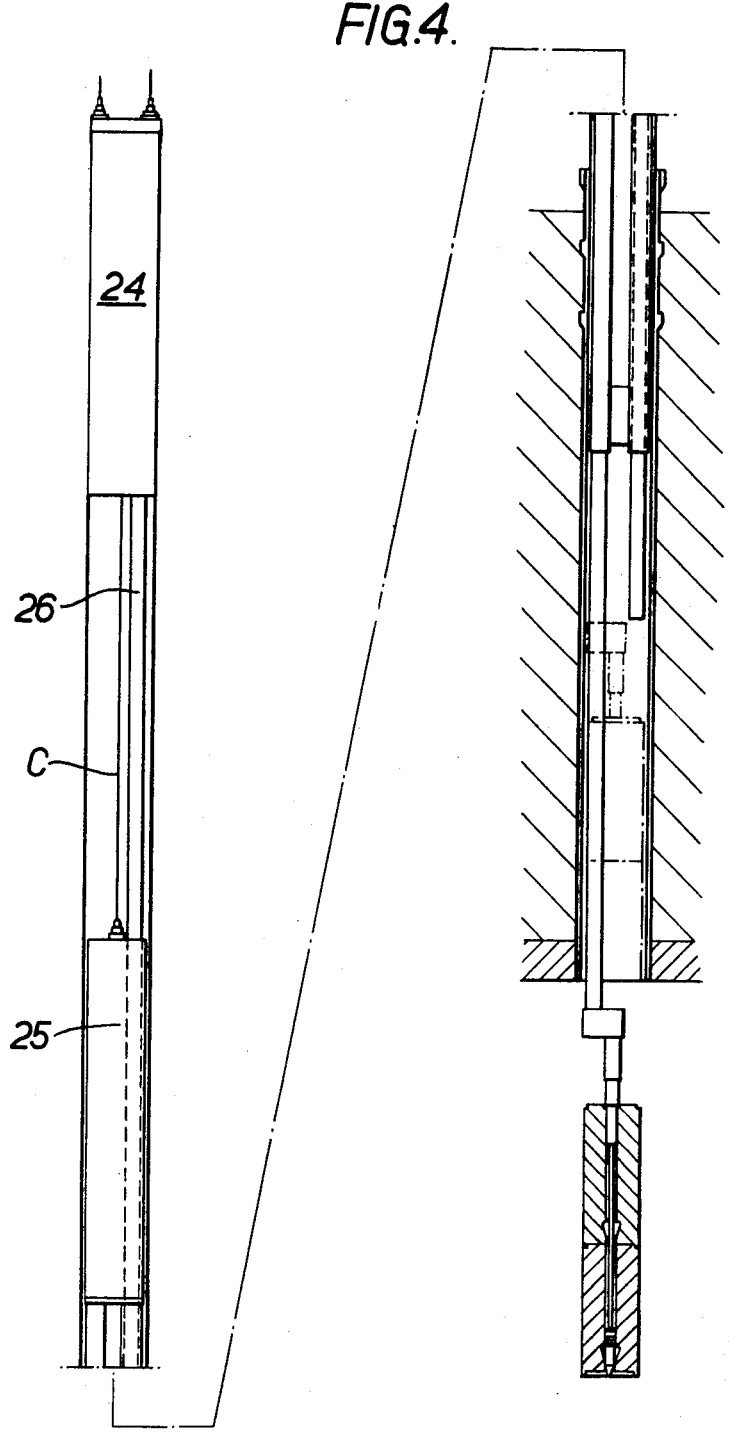
FIG. 4 is a similar view to FIG. 3 with the refuelling machine in a raised position having lifted the core components into the guide tube.
Figure 5A:
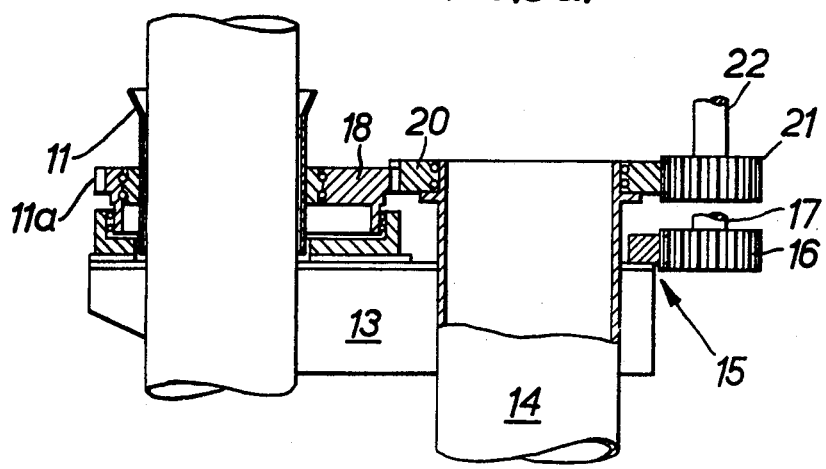
FIG. 5A and 5B are scrap elevation and plan views showing gearing for adjusting the position of guide funnels shown in FIG. 3.
Figure 5B:
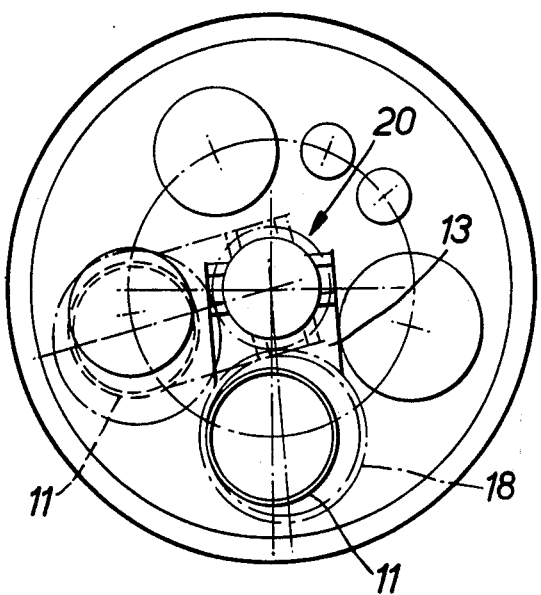

It can then be raised, by raising the charge column into the guide tube as shown in dotted outline in FIG. 4 and then further into the compartment of the charge machine. The guide tube charge cylinder and charge column are then all raised up into the upper extension of the charge machine chamber and the fuel blocks are left in the chamber where they are handled by means of turntables in a conventional manner.

We claim:

1. Apparatus for replacing nuclear reactor core components which are disposed about the axis of an access penetration in a reactor vessel wall, said apparatus comprising a guide tube, said guide tube being introducable into the penetration where the guide tube communicates the vessel interior with a charging compartment located exteriorly of said vessel, an eccentric, mounting means rotatably mounting the eccentric in the tube, a core component engaging member carried by the eccentric, the eccentric having a vertical axis on which it is rotatable, means for adjusting the rotational axis of the eccentric with respect to the tube axis, means for adjusting the axis of the tube relative to that of the penetration.

2. Apparatus for replacing nuclear reactor core components which are disposed about the axis of an access penetration in a reactor vessel wall comprising a guide tube which is introducable into the reactor vessel through the penetration, a dependent member eccentrically mounted in said tubular member so as to be rotatable on its own axis and on the axis of the tubular member, the dependent member having a cranked portion the lower part of which carries a core component gripping device, and means for adjusting the axis of the guide tube relative to that of the penetration.

3. Apparatus as claimed in claim 2 in which the dependent member is movable endwise, said apparatus further including means responsive to such endwise movement for operating the gripping device.

4. Apparatus as claimed in claim 2 in which the dependent member comprises a rod mounted within a tube and mounted for relative endwise movement therebetween.

5. Apparatus as claimed in claim 4 in which the dependent member is rotatable on its axis simultaneous with rotation of the tubular member on its axis.

6. Apparatus as claimed in claim 5 in which there is a fixed ratio between the rotation of the dependent member and the tubular member.

7. Apparatus as claimed in claim 6 in which the fixed ratio is such that rotation of both members occurs simultaneously so that the resulting compound motion is imparted to said core component gripping device.

* * * * *